United States Patent Office 3,442,413
Patented May 6, 1969

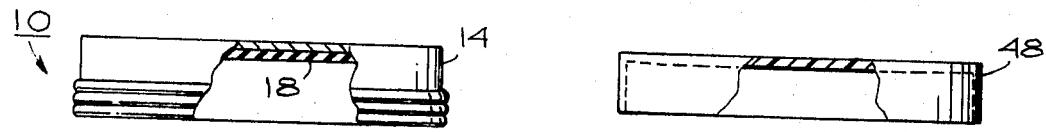
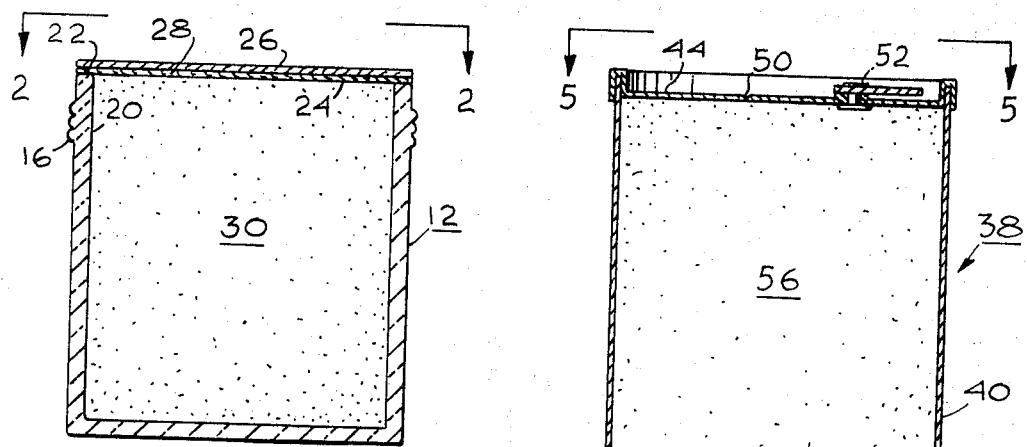
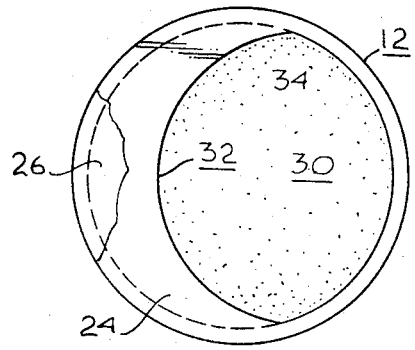
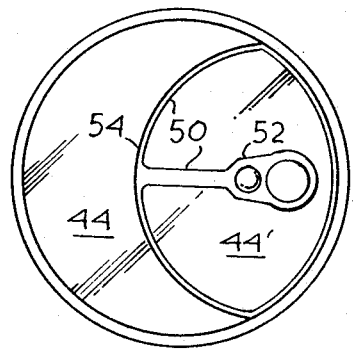
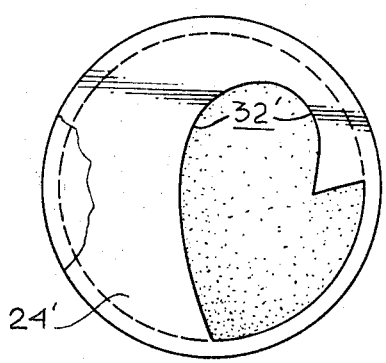

3,442,413
MEASURING ARRANGEMENT
Harry Bernstein, 1642 Ocean Park Blvd.,
Santa Monica, Calif. 90405
Filed May 13, 1966, Ser. No. 549,948
Int. Cl. B65d 47/36
U.S. Cl. 220—90                        1 Claim

ABSTRACT OF THE DISCLOSURE

A relatively stiff sheet of material on the open top of a container for granular or powered material and having an opening providing access to the interior of the container, the opening permitting removal of material by means of a spoon and having an edge adapted to scrape excess material from the spoon and leave only a measured amount thereon. In a preferred form the edge is a continuous curve, substantially straight at one end and of progressively shorter radius toward the other end to variably determine the amount of material left on the spoon.

---

This invention relates to the measuring art and more particularly to an improved arrangement for providing a predetermined measure of the content of a spoon when removing material by the spoon from a container.

In many applications such as cooking and food preparation, drug measurements, or the like, it is often necessary to provide a predetermined measure of the contents of a spoon when it is being removed from the container in which the material is stored. For instance, instant coffee or ground coffee is often measured in amounts relating to a spoonful, that is, a heaping spoonful or a level spoonful or an amount in between, often depending upon the utilizers taste. In other applications, of course, a more or less standard quantity is desired in a teaspoon of material removed from a container throughout numerous repetitions of the removal.

Accordingly, it is an object of applicant's invention herein to provide an improved measuring arrangement.

It is another object of applicant's invention herein to provide a measuring arrangement for providing a predetermined measure of the contents of a spoon in removing material from a container.

It is yet another object of applicant's invention herein to provide an improved container arrangement having structural means thereon allowing the measurement of the content of the spoon in removing material from the container.

The above and other objects are achieved, according to one embodiment of applicant's invention, by providing a container, such as a container of instant coffee with a screw lid type closure. To maintain freshness of the coffee during shipping and shelf storage time, it is often desirable that such a container of instant coffee be provided with a thin disposable sealing disc, often made of paper, that is attached to the upper rim of the container.

According to applicant's invention, in this embodiment thereof, there is provided intermediate the sealing disc and the container a measuring means coupled to the rim of the jar and the sealing means is then coupled to the upper side of the measuring means.

The measuring means is provided with an internal measuring margined edge within the area bounded by the rim portion of the container and the measuring margin has a predetermined curvature and allows the insertion of the spoon into the container to remove the contents.

By scraping the spoon along the measuring margin edge of the measuring means during removal, a predetermined amount of material is left on the spoon, the amount depending upon the radius of curvature of the measuring margin.

In this embodiment of applicant's invention, the measuring means may be fabricated from a thin paper similar to the paper used for the sealing means, or it may be of a thin metal such as aluminum or the like. Further, the measuring margin edge may be of a constant radius of curvature, that is an arc of a circle, wherein there would be provided the same measurement regardless of position on the measuring margin edge, or it may be a varying radius of a curvature in which different amounts of material will be retained in the spoon depending upon the position where the spoon is scraped across the measuring margin edge.

In another embodiment of applicant's invention, a container of ground coffee, for example, is provided with "pull tab" type of top in which there are provided a preselected set of score lines so that the pull tab removes a section of the top to provide an internal measuring margin edge.

In this arrangement, a conventional plastic cap is also provided for maintaining the coffee within the container fresh during non-utilization.

The above and other embodiments of applicant's invention may be more fully understood from the following detailed description taken together with the accompanying drawing wherein similar reference characters refer to similar elements throughout and in which:

FIGURE 1 is a sectional view of one embodiment of applicant's invention;

FIGURE 2 is a view along the line 2—2 of FIGURE 1;

FIGURE 3 illustrates another embodiment of applicant's invention;

FIGURE 4 illustrates another embodiment of applicant's invention; and

FIGURE 5 is a view along the line 5—5 of FIGURE 4.

Before detailing the description of the preferred embodiment of applicant's invention, it will be appreciated that many of the structural features and details illustrated in one embodiment of applicant's invention may equally well be utilized in the other embodiments of applicant's invention shown herein and as may be defined by those skilled in the art. Therefore, this application is intended to cover all such combinations of the various components and features of applicant's invention as may be utilized in the application thereof.

Referring now to FIGURE 1, there is shown one embodiment of applicant's invention, generally designated 10, as it may be utilized, for example, in a container for instant coffee. However, utilization of instant coffee as an example of this embodiment of applicant's invention is not to be construed as limiting upon the scope of applicant's invention.

There is provided a container 12 having a screw top 14 that slidingly engages threads 16 on the container 12. The screw top 14 is also provided with an interior sealing washer 18 that seals under compression. The top portion 20 of the container 12 has a rim 22 upon which is secured a measuring means 24. The measuring means 24 may be fabricated from a waxed paper, a thin aluminum or other metal sheet, plastic, or the like, and may be bonded by cement or any other type of bonding desired for securing the measuring means 24 to the rim portion 22 of the container 12.

A sealing means 26 is detachably coupled to the peripheral edge portion of the upper edge portion 28 of the measuring means 24.

The container 12 is filled, in this example of applicant's invention, with instant coffee 30 which, according to conventional usage, is removed from the container 12 by a spoon.

The sealing means 26 is adapted to be left in place during the shelf life and pre-utilization time of the container 12, but once the instant coffee 30 is to be removed from the container 12, the sealing means 26 is removed from the upper surface 28 of the measuring means 24 and is discarded. Thereafter, sealing is achieved in the conventional fashion by a washer 18 in the screw top 14 bearing against the peripheral edge portion of the upper surface 28 of the measuring means 24.

Referring now to FIGURE 2, there is shown a view of the measuring means 24 and in which the sealing means 26 has been broken away for clarity. In this embodiment of applicant's invention, in order to provide a level surface for sealing, the measuring means 24 is continuous all around the rim 22 of the container 12. The measuring means 24 has an internal measuring margin edge 32 that defines a spoon receiving opening 34 that allows the entrance of a spoon into the container 12 so that the instant coffee 30 may be removed therefrom. Thus, the measuring margin 32 in at least a portion thereof provides a measuring margin edge so that scraping of the spoon thereon during removal of the instant coffee 30 from the container 12 provides a predetermined measure of instant coffee in the spoon.

In the embodiment shown in FIGURE 2, the measuring margin 32 is the arc of a circle so that regardless of where therealong a spoon is scraped during removal of the instant coffee 30, substantially the same amount of instant coffee 30 is retained in the spoon. In other embodiments of applicant's invention, such as shown on FIGURE 3, varying amounts of instant coffee may be retained on the spoon.

As shown on FIGURE 3, there is a measuring means 24' similar to the measuring means 24 shown on FIGURE 2 except that the measuring margin edge 32' thereof is in the form of a curve having a varying radius of curvature. Thus, in those portions of the measuring margin edge 32' in which the radius of curvature is comparatively large, comparatively less instant coffee will be retained on the spoon when it is scraped therealong, and, conversely, where the radius of curvature is comparatively small, substantially a greater amount of instant coffee will be retained in the spoon when it is scraped therealong.

Either the type of curve shown in FIGURE 2 or the type of curve shown in FIGURE 3 for the measuring margin edge 32 and 32', respectively, may be utilized interchangeably as desired by any manufacturer.

From the above description of this embodiment of applicant's invention, it can be seen that applicant's invention is fully compatible with modern high volume production techniques for such material as instant coffee since the only change in the manufacturing technique will be the inclusion of the measuring means 24, which may be accomplished in exactly the same manner that the sealing means 26 is affixed to the container 12, in the absence of the sealing means 24. Thus, the applicant's invention herein is fully compatible and readily adaptable to such high volume production techniques without any substantial modification to the manufacturing process.

Applicant's invention herein may also be equally well utilized in a conventional container for ground coffee. Such an arrangement is illustrated in FIGURES 4 and 5. As shown thereon, there is provided a container 38 according to this embodiment of applicant's invention. The container 38 has a cylindrical body member 40 to which there is crimped a base portion 42 and a "pull tab" type of top closure means 44 which, in this embodiment of applicant's invention provides the measuring means. A crimping of the measuring means 44 and the bottom portion 42 to the cylindrical body member 40 of the container 38 is of conventional technique widely used in the can industry. For sealing after the measuring means 44 has been ruptured or otherwise disturbed, a plastic removable top means 48 is usually provided.

Referring now specifically to FIGURE 5, there is shown a view of the measuring means 44 prior to the time that it is ruptured. As shown on FIGURE 5, the measuring means 44 has preselected score lines 50 thereon to define a predetermined path for removal by the pull tab arrangement 52. Thus, by pulling up on the pull tab arrangement 52, tearing of the measuring means 44 on the score lines 50 is initiated and continued pulling on the pull tab 52 allows removal of the portion 44' of the measuring means 44 and leaves the measuring margin edge 54 against which a spoon may be scraped during removal of the ground coffee 56 from the container 38. It will be appreciated that the score line 50 may be provided in any desired pattern to allow, for example, either a constant radius of curvature in the measuring margin 54 or a varying radius of curvature in the measuring margin 54, as described above, as well as the predetermined size of accesse opening for the spoon to enter the container 56.

In this embodiment of applicant's invention shown in FIGURES 4 and 5, it will be appreciated that once again this arrangement is fully compatible with the high volume production techniques currently utilized in both the canning industries and in the ground coffee industries.

From the above, it is seen that applicant has provided an improved measuring arrangement for providing a predetermined measure of the contents of a spoon during removal of material from a container. This invention and the embodiments shown herein are fully compatible with the manufacturing techniques currently utilized in high volume production.

What is claimed as new and desired to be secured by Letters Patent of the United States is:

1. A measuring arrangement for providing a predetermined measure of the amounts of material in a spoon in removing the material from the container comprising, in combination:

a container having an open top bounded by a rim;

a measuring means comprising a relatively stiff sheet of material sealingly engaging said rim, and said measuring means having an access opening provided with a predetermined shaped edge within the region bounded by said rim to define a spoon access opening therethrough and said spoon access opening having an interior measuring margin edge, whereby scraping the spoon along said interior measuring margin edge during removal of the material of said container provides a predetermined measure of the contents of the spoon;

said predetermined shaped edge in said interior measuring margin being in the shape of a smooth continuous curve having a varying radius of curvature throughout the length thereof, one end being substantially straight and the other end being of short radius whereby varying amounts of material are measured in the removal of the spoon depending upon the position on said measuring margin edge, said spoon is scraped across.

References Cited

UNITED STATES PATENTS

| | | | |
|---|---|---|---|
| 2,092,671 | 9/1937 | Hildebrandt | 220—90 |
| 2,665,029 | 1/1954 | Horrocks | 220—90 |
| 2,925,188 | 2/1960 | Grumbles | 220—90 |
| 3,088,628 | 5/1963 | Horrocks | 220—90 |
| 3,263,855 | 8/1966 | Pugh | 220—90.2 |

RAPHAEL M. SCHWARTZ, *Primary Examiner.*